US011471767B2

(12) United States Patent
Sato

(10) Patent No.: US 11,471,767 B2
(45) Date of Patent: Oct. 18, 2022

(54) INFORMATION PROCESSING SYSTEM, NON-TRANSITORY COMPUTER-READABLE STORAGE MEDIUM, INFORMATION PROCESSING APPARATUS, AND INFORMATION PROCESSING METHOD

(71) Applicant: NINTENDO CO., LTD., Kyoto (JP)

(72) Inventor: Shintaro Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/346,250

(22) Filed: Jun. 13, 2021

(65) Prior Publication Data
US 2021/0299563 A1    Sep. 30, 2021

Related U.S. Application Data

(63) Continuation of application No. 16/808,840, filed on Mar. 4, 2020, now Pat. No. 11,058,951, which is a
(Continued)

(30) Foreign Application Priority Data

May 14, 2014   (JP) .................................. 2014-100714

(51) Int. Cl.
*A63F 13/53*   (2014.01)
*A63F 13/63*   (2014.01)
*A63F 13/837*  (2014.01)

(52) U.S. Cl.
CPC .............. *A63F 13/53* (2014.09); *A63F 13/63* (2014.09); *A63F 13/837* (2014.09)

(58) Field of Classification Search
CPC ......... A63F 13/53; A63F 13/63; A63F 13/837
See application file for complete search history.

(56) References Cited

U.S. PATENT DOCUMENTS

| 5,320,358 A | 6/1994 | Jones |
|---|---|---|
| 6,319,119 B1 | 11/2001 | Konoe |
| (Continued) | | |

FOREIGN PATENT DOCUMENTS

JP   2014-028277   2/2014

OTHER PUBLICATIONS

Mario Party 4 (Game Cube) Stamp Out!, uploaded on Feb. 8, 2011, https://www.youtube.com/watch?v=afhrgiTLKp0 (1 page, representative image attached).
(Continued)

*Primary Examiner* — Omkar A Deodhar
*Assistant Examiner* — Shauna-Kay Hall
(74) *Attorney, Agent, or Firm* — Nixon & Vanderhye P.C.

(57) ABSTRACT

An information processing system includes a controller which receives an operation input of a user and an information processing unit which performs an information process based on the operation input received by the controller. The information processing unit includes a game progress unit which controls an own character in the virtual space based on the operation input of the user to draw the virtual space with the corresponding color of the own character and a battle determination unit which performs a battle determination based on a drawing state of a corresponding color
(Continued)

of an enemy character, which is different from the corresponding color of the own character, to a virtual space and a drawing state of the corresponding color of the own character to the virtual space.

20 Claims, 11 Drawing Sheets

Related U.S. Application Data continuation of application No. 15/912,000, filed on Mar. 5, 2018, now Pat. No. 10,617,953, which is a continuation of application No. 14/487,312, filed on Sep. 16, 2014, now Pat. No. 9,943,758.

(56) References Cited

U.S. PATENT DOCUMENTS

| | | | |
|---|---|---|---|
| 6,488,582 B1 | 12/2002 | Suzuki | |
| 6,606,104 B1 | 8/2003 | Kondo | |
| 7,833,096 B2 | 11/2010 | Sakaguchi | |
| 9,069,796 B2 | 6/2015 | Saito | |
| 2002/0098890 A1 | 7/2002 | Sakaguchi | |
| 2003/0166413 A1* | 9/2003 | Hayashida | A63F 13/005 463/30 |
| 2007/0213107 A1 | 9/2007 | Itou | |
| 2008/0194337 A1 | 8/2008 | Hensel | |
| 2012/0196678 A1* | 8/2012 | Fujisawa | A63F 13/45 463/31 |
| 2012/0252575 A1 | 10/2012 | Iida et al. | |
| 2015/0328548 A1 | 11/2015 | Shintaro | |

OTHER PUBLICATIONS

Mario Party 9 (Wii) Flinger Painting, uploaded on Apr. 30, 2012. https://www.youtube.com/watch?v=JdLnjjkCIMA (1 page, representative image attached).

Color Wars, uploaded on Apr. 14, 2012, https://www.youtube.com/watch?v=96WZJusSqR0#t=16 (1 page, representative image attached).

De Blob Game, released Sep. 22, 2008, "mix and match colors to paint de world", pp. 1-5.

De Blob Game, released Sep. 22, 2008, "screenshots, images, and pictures", pp. 1-15.

Extreme Paintball, released Oct. 20, 1998, "first person shooter game based on paintball", pp. 1-3.

Non Patent Literature search history, Nov. 27, 2017, p. 1.

http://www.mariowiki.com/Stamp_Out! (mini game); http://www.mariowiki.com/Mario_Party_4.

Office Action in U.S. Appl. No. 15/911,931 dated Apr. 5, 2019 (25 pages).

Notification of Reasons for Refusal in JP Office Action No. 2018-010956 dated Feb. 19, 2019 with English translation (10 pages).

https://www.susipaku.com/pakuflash-powerpaintball.html, Feb. 12, 2011 (7 pages).

Action Dimension Power Paintball Gameplay Walkthrough Part 1, dated Jan. 5, 2014, https://www.youtube.com/watch?v=vJu9iFGNJC0, (1 page, representative image attached).

https://web.archive.org/web/20131002150547/http://creative-mobile.com/2013/09/24/new-release-war-of-tanks/, pp. 1-3 (Year:2013).

* cited by examiner

INFORMATION PROCESSING SYSTEM, NON-TRANSITORY COMPUTER-READABLE STORAGE MEDIUM, INFORMATION PROCESSING APPARATUS, AND INFORMATION PROCESSING METHOD

CROSS REFERENCE TO RELATED APPLICATION

This application is a continuation of Ser. No. 16/808,840, filed Mar. 4, 2020; which is a continuation of U.S. application Ser. No. 15/912,000, filed Mar. 5, 2018, now U.S. Pat. No. 10,617,953, issued Apr. 14, 2020; which is a continuation of U.S. application Ser. No. 14/487,312, filed Sep. 16, 2014, now U.S. Pat. No. 9,943,758, issued on Apr. 17, 2018; and claims priority to Japanese Patent Application No. 2014-100714, filed on May 14, 2014; the entire contents of each being incorporated herein by reference.

FIELD

The technology herein relates to an information processing system providing a game in which a character is controlled in a virtual space, a non-transitory computer-readable storage medium, an information processing apparatus, and an information processing method.

BACKGROUND AND SUMMARY

Conventionally, there is known a game in which a user operates an operation input unit to control a character in a virtual space.

The game in the related art includes games such as a game in which a character in the virtual space is controlled while passing obstacles and dodging an attack from the enemy character, or attacking the enemy character, the character is aimed to arrive at a destination thereof, and a game in which the character overcomes challenges (adventures, problems, explorations, combats, and the like) given in the virtual space to achieve a goal.

The present disclosure provides a new game in which the character in the virtual space is controlled. Further, in the following, the character controlled by a user's operation will be referred to as an "own character".

An information processing system of an exemplary embodiment includes an operation input receiver configured to receive an operation input of a user, and an information processor configured to perform an information process based on the operation input received by the operation input receiver. The information processor includes a game progress processor which controls an own character in the virtual space based on the operation input to draw the virtual space with a corresponding color of the own character, and a battle determination processor which performs a battle determination based on a drawing state of a corresponding color of an enemy character, which is different from the corresponding color of the own character, to the virtual space and a drawing state of the corresponding color of the own character to the virtual space. With this configuration, the virtual space is drawn with the corresponding color of the own character by controlling the own character in the virtual space, and the battle determination is performed based on the drawing state thereof and the drawing state of the corresponding color of the enemy character.

The game progress processor may cause the own character in the virtual space to perform a drawing operation based on the operation input, and to draw a drawing area of the virtual space corresponding to the drawing operation with the corresponding color of the own character. With this configuration, the drawing area corresponding to the drawing operation of the own character can be drawn with the corresponding color.

The game progress processor may cause the own character to move in the virtual space based on the operation input, and to draw a drawing area according to a position of the own character in the virtual space with the corresponding color of the own character. With this configuration, the drawing area corresponding to a position of the own character in the virtual space can be drawn with the corresponding color.

The game progress processor may draw the virtual space with the corresponding color of the own character based on an operation input of one or a plurality of fellow users. With this configuration, a cooperative play with another user can be allowed.

The game progress processor may draw the virtual space with the corresponding color of the enemy character based on an operation input of one or a plurality of opponent users. With this configuration, a battle play with another user can be allowed.

The battle determination processor may perform the battle determination by comparing a drawn area drawn with the corresponding color of the own character and a drawn area drawn with the corresponding color of the enemy character. With this configuration, victory or defeat can be determined by wideness of the drawn area. Further, when a play time reaches a predetermined time, the drawn areas may be compared with each other for the battle determination.

The information processing system may further include a communication module. The game progress processor may generate own character drawing event data which indicates a content of a drawing event to draw the virtual space with the corresponding color of the own character based on the operation input received by the operation input receiver. The communication module may transmit the own character drawing event data to the information processing system of an opponent user, and receive enemy character drawing event data which is generated based on the operation input of the opponent user and indicates a content of a drawing event to draw the virtual space with the corresponding color of the enemy character. The game progress processor may draw the virtual space with the corresponding color of the own character and the corresponding color of the enemy character based on the own character drawing event data and the enemy character drawing event data. With this configuration, a communication battle game with another user is realized. Since amount of drawing data used to draw the corresponding color in the virtual space is relatively large, it is not realistic to frequently transmit and receive the drawing data in the communication battle game to share the drawing state. Meanwhile, according to the above-mentioned configuration, since drawing event data indicating a content of the drawing event having a relatively small size is transmitted and received instead of the drawing data having a relatively large size in the communication battle game, the drawing state in the information processing system can be shared among a plurality of users without transmitting and receiving large data in the communication battle game.

The own character drawing event data and the enemy character drawing event data may include information of a position and a color of the virtual space in which the corresponding color is drawn. With this configuration, the sizes of the own character drawing event data and the enemy character drawing event data can be reduced. Further, in a case where the corresponding color of each character is already known, information of the character or the team to which the character belongs becomes color information.

The own character drawing event data and the enemy character drawing event data may include information indicating a time of an event. The game progress processor may perform drawing in the virtual space based on the time information when the corresponding color of the own character and the corresponding color of the enemy character are drawn in an overlapping manner. With this configuration, even when the reception of the enemy character drawing event data is delayed due to a transmission delay, a temporal relation with the own character drawing event data can be exactly understood. This situation is also the same with the information processing system of the opponent user; that is, even when the reception of the own character drawing event data is delayed in the information processing system of the opponent user, the temporal relation with the enemy character drawing event data can be exactly understood, so that the temporal relation is matched with that of the information processing system of the user of the own character.

The communication module may perform communication through the Internet. With this configuration, the battle play or the cooperative play with another user can be performed through the Internet.

The game progress processor may control the own character in the virtual space based on the operation input, and make an attack on the enemy character. With this configuration, a battle game accompanying attacks can be realized.

The game progress processor may draw the virtual space with the corresponding color of the own character when the attack of the own character on the enemy character is successful. With this configuration, a drawing range of the corresponding color of the own character can be widened through the attack on the enemy character.

The game progress processor may draw a peripheral area of the enemy character in the virtual space with the corresponding color of the own character when the attack of the own character on the enemy character is successful. With this configuration, through the attack on the enemy character, surroundings of the enemy character can be painted with the corresponding color of the own character.

The game progress processor may display drawing results of the corresponding color of the own character and the corresponding color of the enemy character in the entire virtual space based on the operation input. With this configuration, the user can confirm drawing results of the corresponding color of the own character and the corresponding color of the enemy character.

The virtual space may be a 3D space. With this configuration, a drawing game can be realized in the 3D space.

The game progress processor may draw a ground of the 3D space with the corresponding color.

A non-transitory computer-readable storage medium having stored therein an information processing program of an exemplary embodiment, the information processing program causing a computer to function as an information processor configured to receive an operation input of a user, control an own character in the virtual space based on the operation input to draw the virtual space with a corresponding color of the own character, and perform a battle determination based on a drawing state of a corresponding color of an enemy character, which is different from the corresponding color of the own character, to the virtual space and a drawing state of the corresponding color of the own character to the virtual space. Even with this configuration, the virtual space is drawn with the corresponding color of the own character by controlling the own character in the virtual space, and the battle determination is performed based on the drawing state and the drawing state of the corresponding color of the enemy character.

An information processing apparatus of an exemplary embodiment includes an operation input receiver configured to receive an operation input of a user and an information processor configured to perform an information process based on the operation input received by the operation input receiver. The information processor includes a game progress processor which controls an own character in a virtual space based on the operation input to draw the virtual space with a corresponding color of the own character, and a battle determination processor which performs a battle determination based on a drawing state of a corresponding color of an enemy character, which is different from the corresponding color of the own character, to the virtual space and a drawing state of the corresponding color of the own character to the virtual space. Even with this configuration, the virtual space is drawn with the corresponding color of the own character by controlling the own character in the virtual space, and the battle determination is performed based on the drawing state and the drawing state of the corresponding color of the enemy character.

An information processing method of an exemplary embodiment includes receiving an operation input of a user, controlling an own character in the virtual space based on the received operation input to draw the virtual space with a corresponding color of the own character, and performing a battle determination based on a drawing state of a corresponding color of an enemy character, which is different from the corresponding color of the own character, to the virtual space and a drawing state of the corresponding color of the own character to the virtual space. Even with this configuration, the virtual space is drawn with the corresponding color of the own character by controlling the own character in the virtual space, and the battle determination is performed based on the drawing state and the drawing state of the corresponding color of the enemy character.

DETAILED DESCRIPTION OF NON-LIMITING EXEMPLARY EMBODIMENTS

Figure 1:
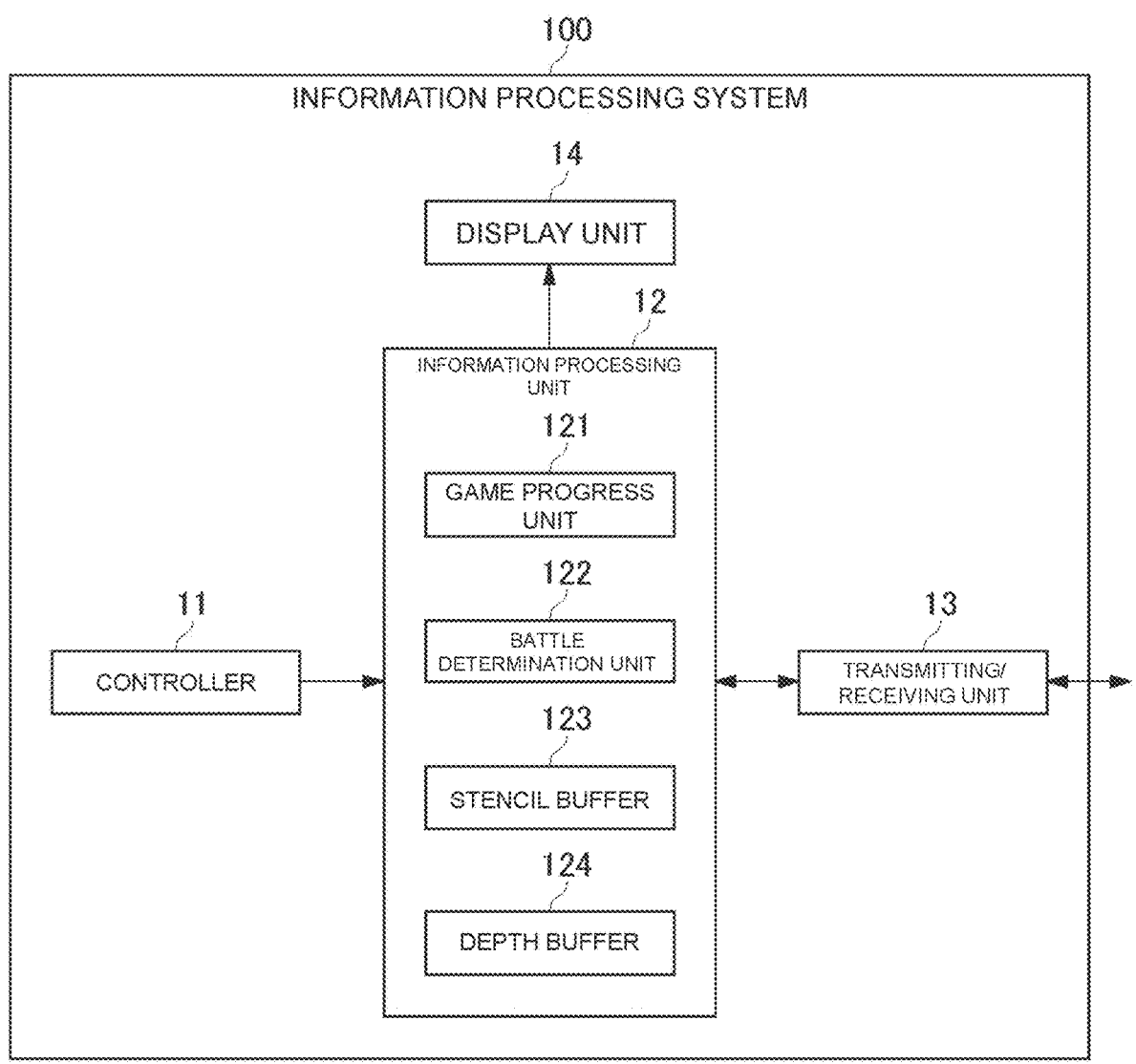
FIG. 1 shows a block diagram of an example non-limiting configuration of an information processing system.

Hereinafter, an information processing system according to an embodiment of the technology will be described with reference to the drawing. Further, the embodiment to be described below shows an example in a case where the technology is implemented, and the technology is not limited to the specific configuration to be described below. A specific configuration according to the embodiment may be appropriately employed to the implementation of the technology.

FIG. 1 shows a diagram of an example non-limiting configuration of an information processing system. An information processing system 100 of the embodiment provides a game in which the virtual space is drawn with a corresponding color of the own character by controlling the own character in a virtual space, and a battle determination is performed based on the drawing state thereof and a drawing state of a corresponding color of an enemy character. The information processing system 100 includes a controller 11 serving as an operation input receiver, an information processing unit 12 serving as an information processor, a transmitting/receiving unit 13 serving as a communication module, and a display unit 14 as an output device which displays a video. The output device may further include a speaker which outputs a voice and a vibrator which vibrates and outputs a dynamic force.

Further, FIG. 1 illustrates an example of the information processing system 100 which includes the controller 11, the information processing unit 12, the transmitting/receiving unit 13, and the display unit 14 and is provided as an integrated apparatus, but these components may be distributed into a plurality of devices and transmit/receive information therebetween in a wired or wireless manner as needed. For example, the information processing system 100 may be a portable game apparatus which includes the controller 11, the information processing unit 12, the transmitting/receiving unit 13, and the display unit 14, or may be configured to include a game apparatus body which integrally includes the information processing unit 12 and the transmitting/receiving unit 13, the controller 11 which communicates with the game apparatus body by a near field communication, and the display unit 14 which receives display data from the game apparatus body through a cable and outputs the data. Further, the information processing unit 12 may be present on a communication network.

The information processing unit 12 includes a game progress unit 121 which progresses the game based on an operation input into the controller 11 and data on an opponent user or a fellow user received by the transmitting/receiving unit 13 from the information processing system 100, a battle determination unit 122 which performs the battle determination based on a game result of the game progress unit 121, a stencil buffer 123, and a depth buffer 124.

The game progress unit 121 and the battle determination unit 122 of the information processing unit 12 is realized such that a general purpose processor such as a central processing unit (CPU) and a graphics processing unit (GPU) performs a game program as an information processing program of the embodiment of the technology. The game program is provided using a non-transitory computer-readable storage medium, and the game progress unit 121 and the battle determination unit 122 are realized such that the information processing unit 12 reads the game program out of the storage medium. Further, the game progress unit 121 and the battle determination unit 122 may be realized such that the game program is received through the transmitting/receiving unit 13, and is installed and executed by the information processing unit 12.

The transmitting/receiving unit 13 transmits various types of data to another information processing system 100 through a communication network such as the Internet, and receives data transmitted from another information processing system 100 through the communication network. In the embodiment, particularly, drawing event data to be described below is transmitted and received by the transmitting/receiving unit 13 through the communication network. The transmitting/receiving unit 13 may include an interface for wire communication, or may include a communication module for wireless communication. The display unit 14 outputs graphic data generated by the GPU of the information processing unit 12.

The game progressed by the game progress unit 121 and the battle determination performed by the battle determination unit 122 will be described. In the game of the embodiment, the own character and the enemy character are provided in association with colors different from each other. A color associated to each character will be referred to as a corresponding color. In the game, the own character is operated in a 3D virtual space to paint the ground with the corresponding color of the own character, and similarly the enemy character paints the ground with the corresponding color of the enemy character.

The own character may have one or plural fellow characters which are operated by another user (a fellow user). In this case, the own character and the fellow character form an own team, and the own character and the fellow character have the same corresponding color. Therefore, the cooperative play can be performed by a plurality of users. Further, the enemy character may have the fellow characters. In this case, these characters form an enemy team, and the characters belonging to the enemy team have the same corresponding color.

Further, the characters may be divided into three or more teams. In this case, the corresponding color is set to be different for each team, the characters belonging to the same team with the own character become the fellow characters, the other teams become the enemy teams, and the characters belonging to the enemy teams become the enemy characters. In the embodiment, a battle between the own team including the own character and the plurality of fellow characters and the enemy team including the plurality of enemy characters will be described as an example. In the following, the corresponding color of the own team is referred to as an "own color", and the corresponding color of the enemy team will be referred to as an "enemy color".

Further, the enemy character may be operated by the game progress unit 121 according to the game program based on the operations of the own character and the fellow character and the game program, or may be operated according to an operation input of another user. In a case where the enemy character is operated based on the operation input of another user, the battle play with another user is realized. In the embodiment, an example in which another user operates the enemy character will be described.

Further, the fellow character may be operated by the game progress unit 121 according to the game program based on the operations of the own character and the enemy character and the game program, or may be operated according to an operation input of another user. In a case where the fellow character is operated based on the operation input of another user, the cooperative play with another user is realized.

The respective characters including the own character, the fellow character, and the enemy character can move in a common 3D virtual space. Further, the respective characters can also change their directions in the virtual space. Furthermore, the respective characters have their own color ink, and can paint the ground around their positions in the virtual space with their own color ink. Further, in the embodiment, the coloring of the ground of the virtual space with the corresponding color of each character during the game will be expressed as "the ground is painted with the corresponding color (of the ink)" when it is focused on a game progressed in the 3D virtual space, and will be expressed as "the ground is drawn with the corresponding color" when it is focused on an information process in the information processing unit 12.

The user issues a drawing event by operating the own character, and can paint the ground of the virtual space. Specifically, an area is painted with the corresponding color according to a position and a direction of the own character in the virtual space, and a type of the drawing event. As the type of the drawing event, "Shooting of the ink gun", "Painting with a roller", and "Attack on the enemy character" are included. The type of the drawing event corresponds to the shape of the area to be drawn.

Figure 2:
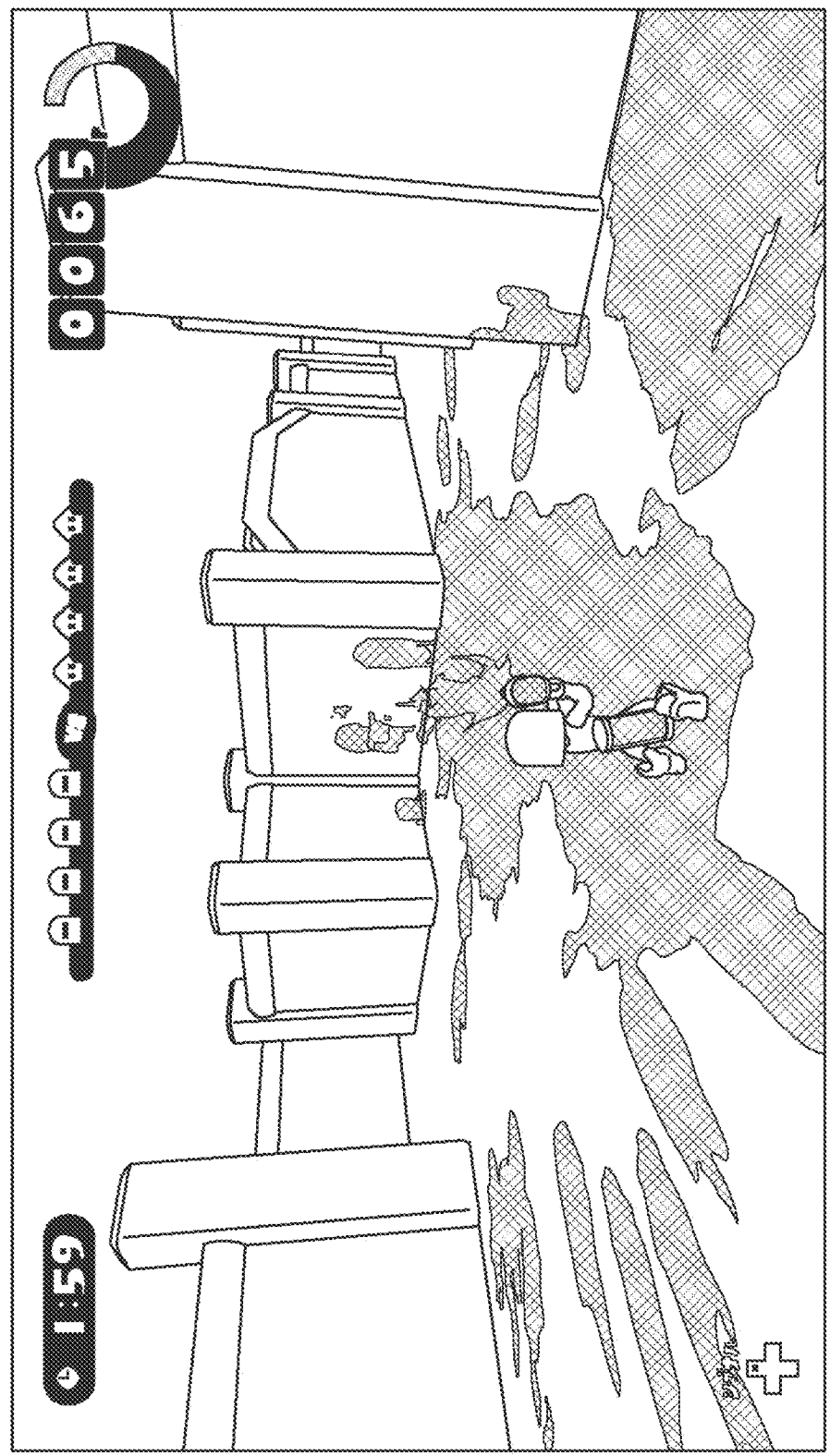
FIG. 2 shows an example non-limiting screen of a scene in which an own character shoots an ink gun to paint a ground.

In the drawing event "Shooting of the ink gun", the ink is painted in a landing area when the ink is shot from the position (the start point) of the own character toward a direction the own character faces. The shooting of the ink gun may be performed in a plurality of shooting methods, a shooting direction may be adjusted in a vertical direction besides a horizontal direction, and a shooting strength may be adjusted. FIG. 2 shows an example non-limiting screen of a scene in which the own character shoots the ink gun to paint the ground. In the drawing event "Painting by a roller", when the own character moves in the virtual space, the ground is painted with the ink by the width of the roller in the moving direction. Herein, a plurality of different roller widths may be provided.

The drawing event "Attack on the enemy character" refers to shooting the ink gun toward the enemy character, and when the shot ink hits the enemy character, the attack becomes successful. When the attack is successful, the attacked enemy character scatters the ink of the corresponding color of the attacking character to the surroundings. Therefore, the ground around the attacked enemy character is painted with the corresponding color of the attacking character. In this way, a drawing range of the own color can also be increased through the attack on the enemy character.

Figure 3B:
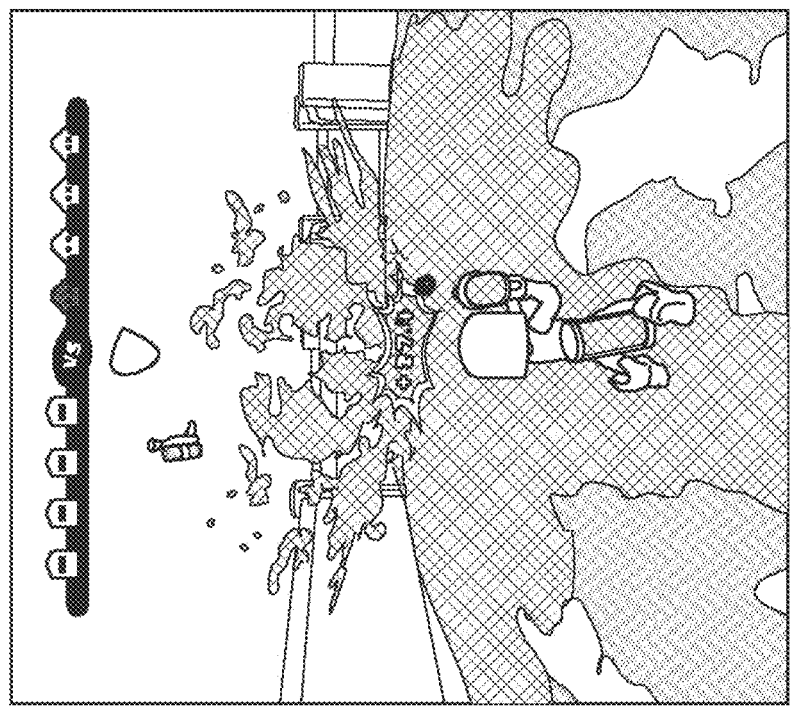
FIG. 3B shows an example non-limiting screen of a scene in which the attack on the enemy character is successful and surroundings of the enemy character is painted with a color corresponding to the own character attacked.
Figure 3A:
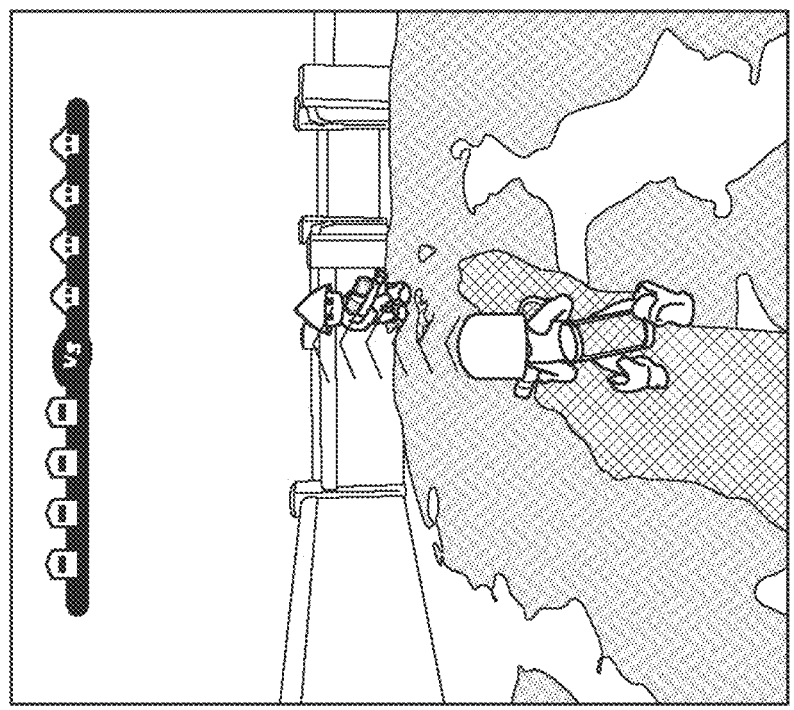
FIG. 3A shows an example non-limiting screen of a scene in which the enemy character is attacked.

FIGS. 3A and 3B show examples non-limiting screens in which the own character succeeds in attacking on the enemy character to paint the surroundings of the enemy character with the own color. Specifically, FIG. 3A shows an example non-limiting screen of a scene in which the enemy character is attacked, and FIG. 3B shows an example non-limiting screen of a scene in which the attack on the enemy character is successful and surroundings of the enemy character is painted with a color corresponding to the own character.

The drawing event "Shooting of the ink gun" is defined by a type of the drawing event (Shooting of the ink), a position of the character, a shooting direction (horizontally, or horizontally and vertically), a type of the ink gun (in a case where a plurality of guns are present), strength (in a case where the shooting is adjustable), and a color of the ink (the corresponding color of the character). Further, the drawing event "Painting by the roller" is defined by a type of the drawing event (Painting by the roller), a position of the character, a moving direction, a width of the roller (in a case where a plurality of rollers are present), and a color of the ink (the corresponding color of the character). Further, the drawing event "Attack on the enemy character" is defined by a type of the drawing event (Attack on the enemy character), a position of the enemy character, and a color of the ink (the corresponding color of the attacking character).

Figure 4B:
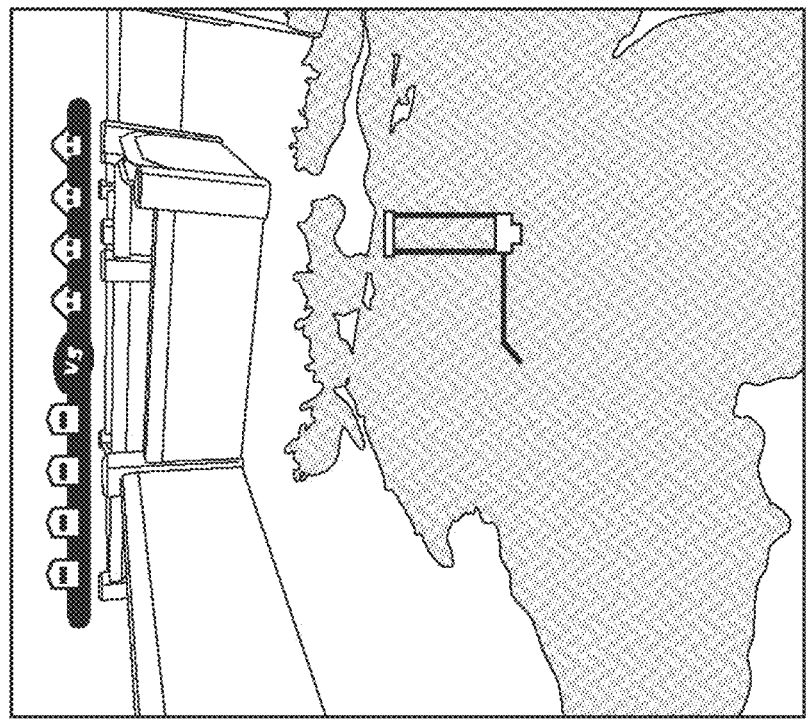
FIG. 4B shows an example non-limiting screen of a scene after a character is assimilated into the ink painted on the ground.
Figure 4A:
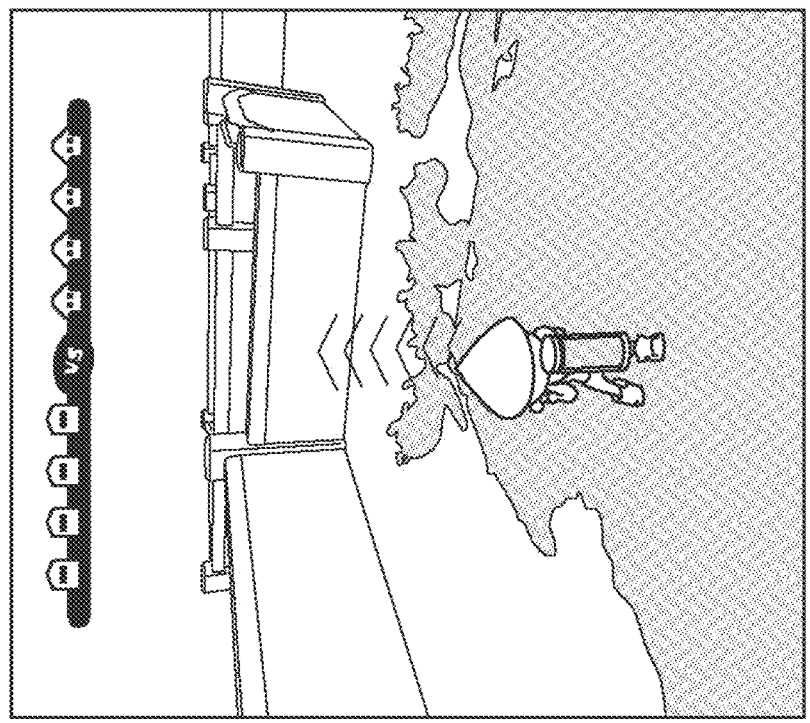
FIG. 4A shows an example non-limiting screen of a scene before a character is assimilated into the ink painted on the ground.

When moving in the virtual space, each character is assimilated into the ink according to the operation of the user in an area painted with the ink of the corresponding color of the own team, so that the character can disappear. In a state where the character is assimilated into the ink and disappears, the character can move in the virtual space at a high speed. Since the own character disappears, the own character is not displayed in the screen of the user who operates the enemy character. FIGS. 4A and 4B show examples non-limiting screens of scenes in which the character is assimilated into the ink painted on the ground. Specifically, FIG. 4A shows an example non-limiting screen of a scene before the character is assimilated, and FIG. 4B shows an example non-limiting screen of a scene after the character is assimilated. Further, the moving speed of the own character is slowed down in an area painted with the corresponding color of the enemy team. In this way, the game progress unit 121 performs movement control of the character with respect to the input operation from the controller 11 according to the drawing state at the position of the own character. In other words, the game progress unit 121 causes the character to move at a speed corresponding to the drawing state at the position of the own character.

Figure 5:
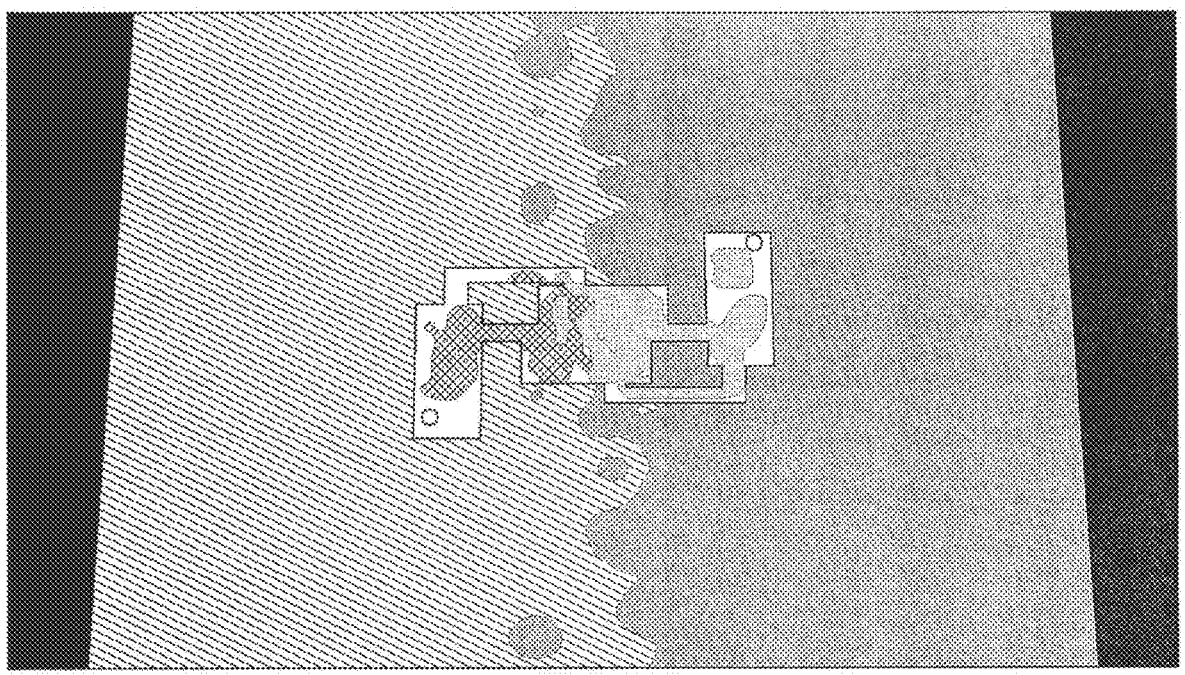
FIG. 5 shows an example non-limiting elevated screen.

Further, when a predetermined operation is performed by the user during the game, the game progress unit 121 displays the drawing states of the corresponding colors of the respective teams in the entire virtual space at that time. Specifically, the game progress unit 121 displays the corresponding colors of the respective teams in an elevated screen of the virtual space. FIG. 5 shows an example non-limiting elevated screen. Along with the elevated screen, sizes of the drawn areas of the respective teams may be displayed by a graph or numerical values.

In the virtual space, the ground once painted with the corresponding color of a certain team can be repainted by painting the ground thereon again with the corresponding color of another team. In other words, the ground of the virtual space is drawn with the lastly painted color. Even though the ground is an area painted with the enemy color, the area is painted with the own color by painting the area with the own color thereon, and vice versa.

Figure 6:
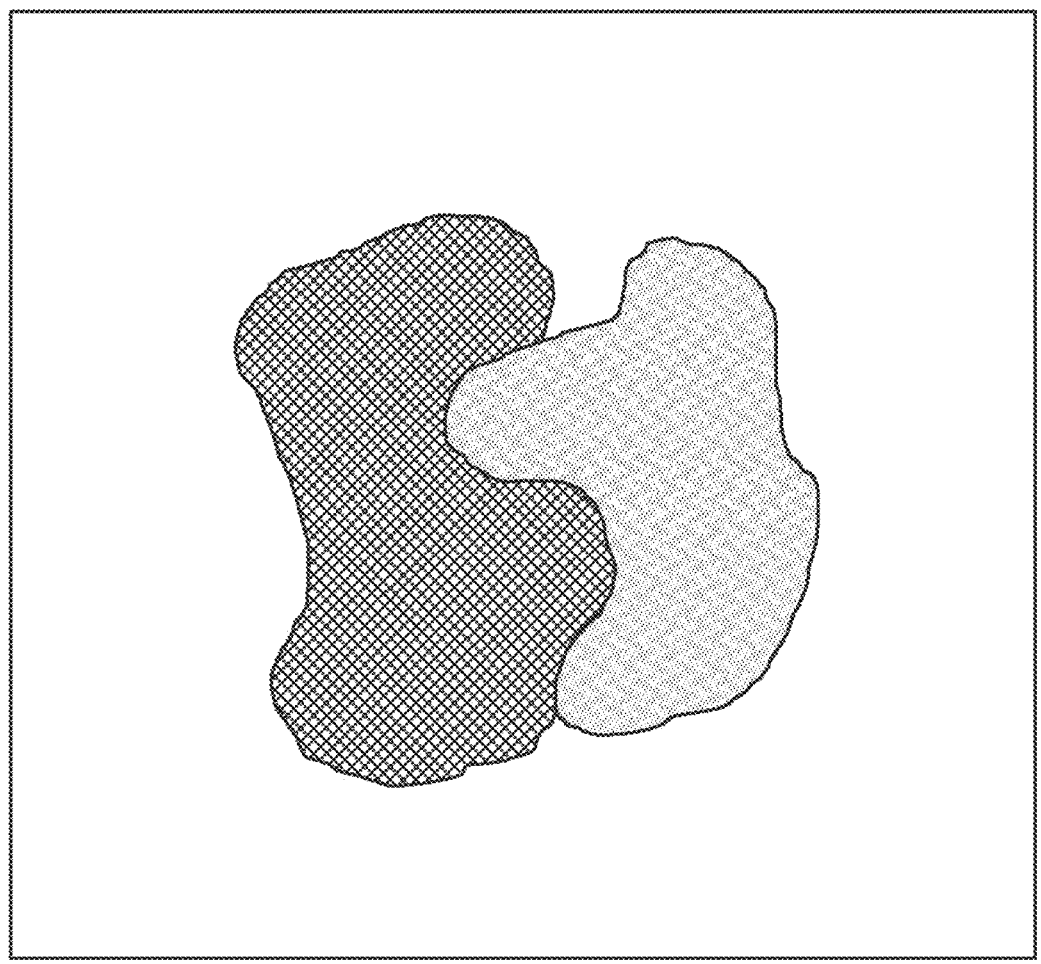
FIG. 6 shows an example non-limiting virtual space of which the ground is drawn.

In the game progress unit 121, the drawing (coloring) of the virtual space with the corresponding color is performed based on drawing data indicating which portion (pixel) of the virtual space is drawn with the corresponding color of which team. The game progress unit 121 fills a texture of a size covering the entire virtual space with the color of the ink according to the drawing data, projects the texture to the virtual space, and thus draws the virtual space. Specifically, when the color of the ink fills the texture, the game progress unit 121 writes a symbol indicating a team as the drawing data in the stencil buffer 123. In a case where a drawing operation is performed with the corresponding color of a certain team, only when information matched with the symbol indicating the team is written in the stencil buffer 123, a command of drawing the corresponding color of the team is executed through the GPU. FIG. 6 shows an example non-limiting virtual space of which the ground is drawn. The state of the drawing is displayed by a texture of 3200×3200 pixels.

In a case where a battle game or a cooperation game is performed by communicating with other users who operate the enemy characters or the fellow characters, when the drawing data is frequently transmitted and received, an appropriate sharing of the drawing state with the other users is disadvantageous in a method of regularly transmitting and receiving all the data since the magnitude of the drawing data is relatively large.

Therefore, in order to share the drawing state in a case where a plurality of users play the game through communication, each information processing system 100 generates and transmits a relatively small size of drawing event data instead of a relatively large size of drawing data from the transmitting/receiving unit 13 to the information processing system 100 of another user according to an issued drawing event during the game, and also receives the drawing event data instead of the drawing data from the information processing system 100 of another user. The drawing event data is data indicating the content of the drawing event in order to generate the drawing data, and the game progress unit 121 generates the drawing data based on the drawing event data. In this way, since a communication battle game is performed by transmitting and receiving the drawing event data instead of the drawing data, a communication load is not increased and the plurality of users can share the drawing state at all time.

The game progress unit 121 generates own character drawing event data based on the operation input received by the controller 11. The own character drawing event data indicates the content of the drawing event for drawing the corresponding color of the own character in the virtual space. The transmitting/receiving unit 13 transmits the own character drawing event data generated by the game progress unit 121 to the information processing system 100 of another user, and receives the drawing event data of the enemy character or the fellow character operated by another user from the information processing system 100 of another user.

Figure 7:
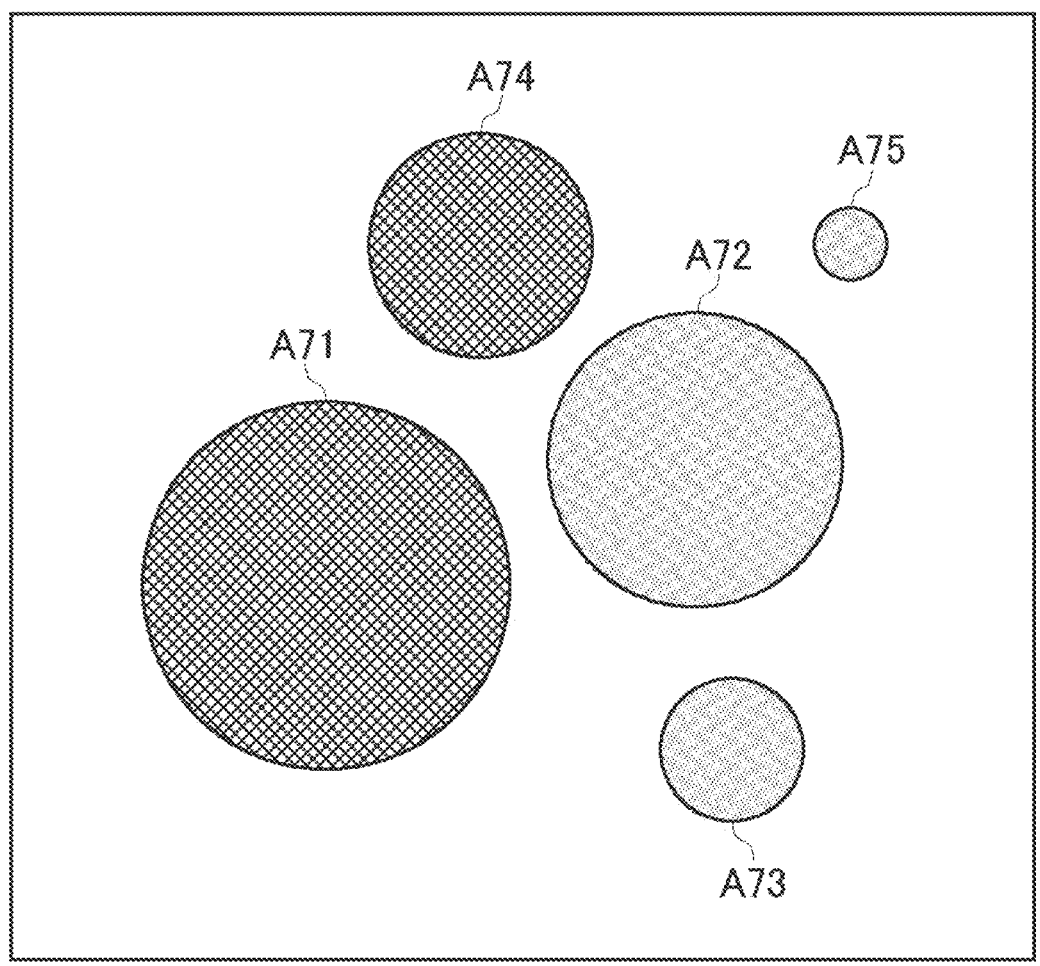
FIG. 7 shows an example non-limiting drawing operation which is performed based on drawing event data.

FIG. 7 shows an example non-limiting drawing operation which is performed based on drawing event data. In this example, the drawing event is defined by a center position, a radius, and a color, and the drawing operation is performed by a circular painting. In the example of FIG. 7, Area A71 is painted with orange according to the drawing event data such as "Position: (3, 4), Radius: 5 m, Color: Orange", Area A72 is painted with blue according to the drawing event data such as "Position: (6, 5), Radius: 4 m, Color: Blue", Area A73 is painted with blue according to the drawing event data such as "Position: (6, 3), Radius: 2 m, Color: Blue", Area A74 is painted with orange according to the drawing event data such as "Position: (4, 7), Radius: 3 m, Color: Orange", and Area A75 is painted with blue according to the drawing event data such as "Position: (7, 7), Radius: 1 m, Color: Blue".

Figure 8:
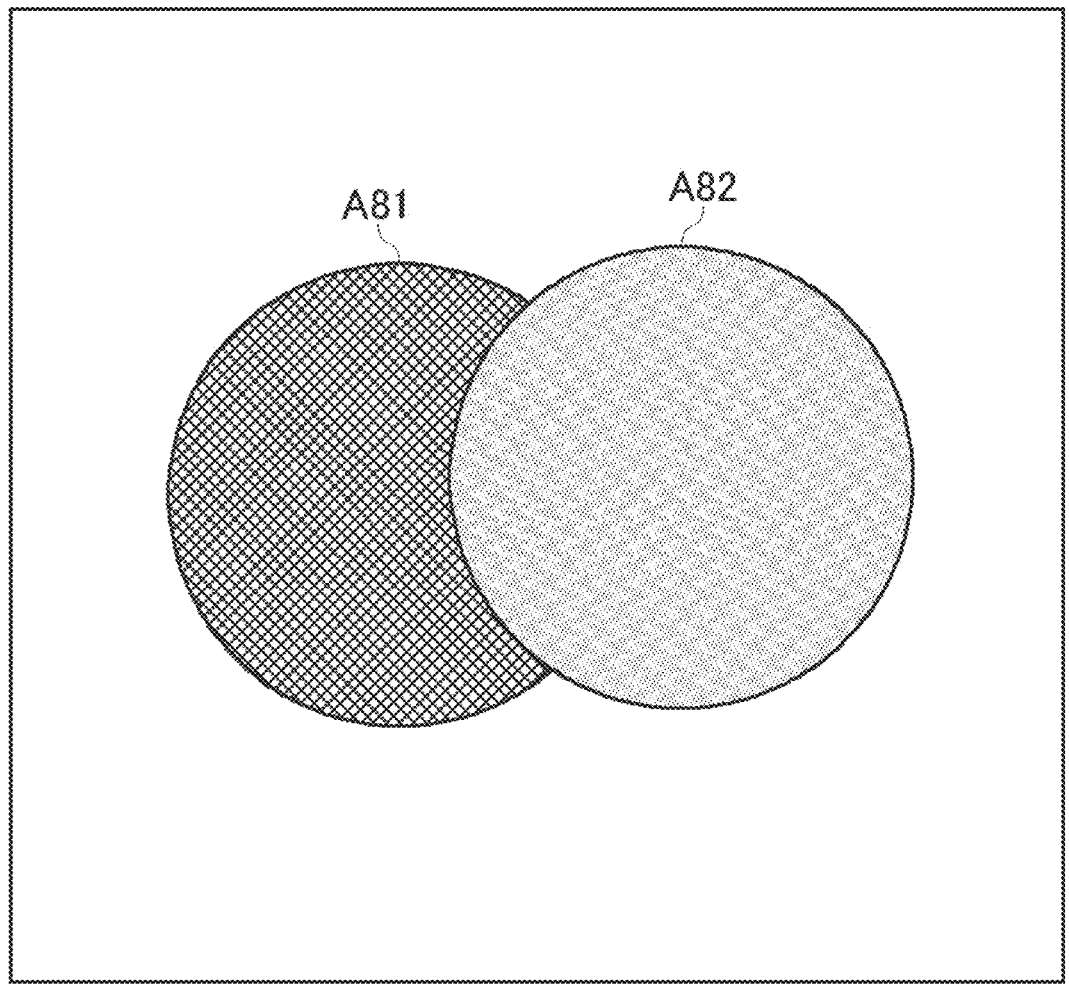
FIG. 8 shows an example non-limiting drawing states which are inconsistent.
Figure 9:
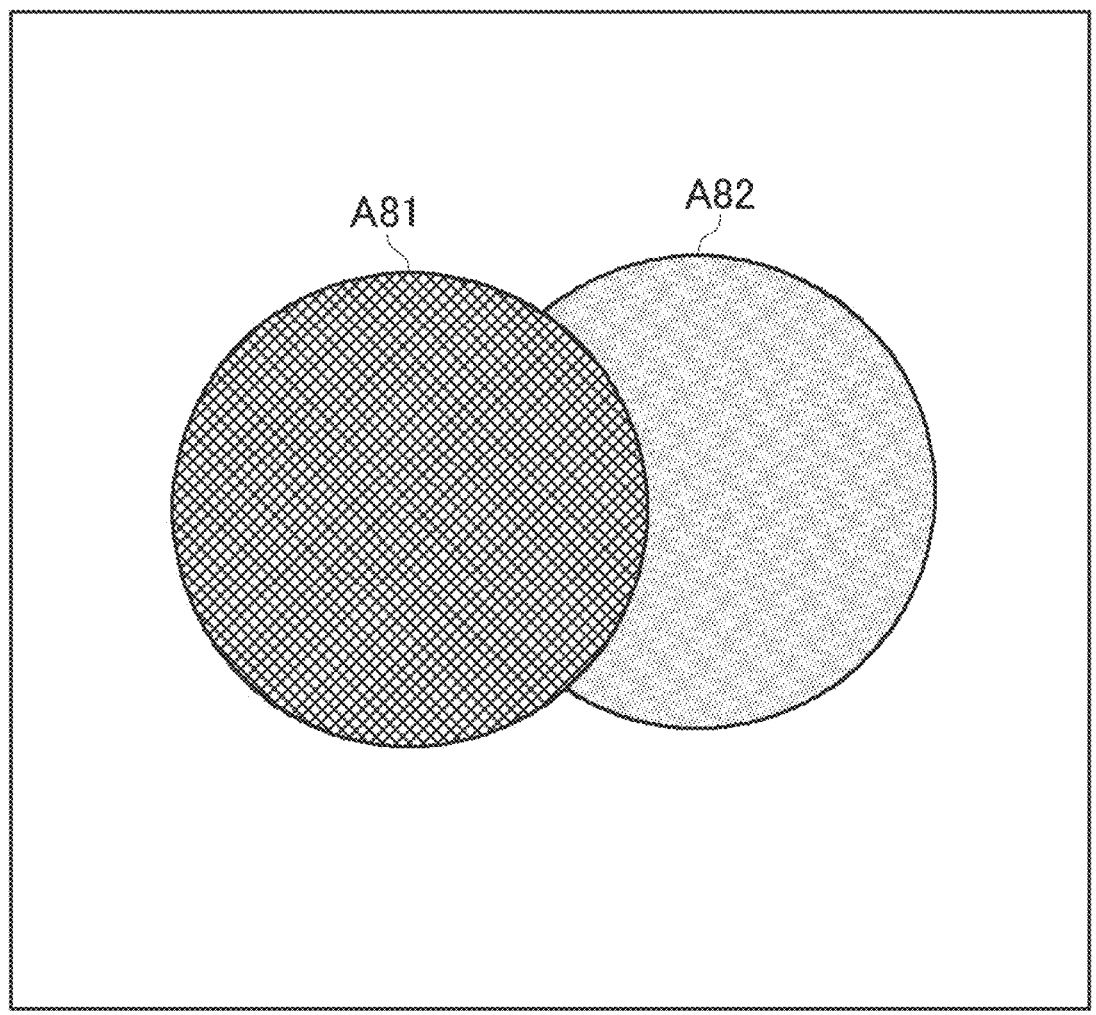
FIG. 9 shows an example non-limiting drawing states which are inconsistent.

In the communication battle game or cooperation game, when a plurality of characters color (draw) an overlapping area at almost the same time, the drawing states may be inconsistent between the plurality of users due to a transmission delay in a communication network in some cases. FIGS. 8 and 9 show examples non-limiting drawing states which are inconsistent. As illustrated in FIG. 8, in a case where the drawing event that the enemy character paints Area A82 partially overlapping with Area A81 with the corresponding color of the enemy character occurs immediately after the drawing event that the own character paints Area A81 with the own color occurs, the game progress unit 121 of the user of the own character paints Area A81 with the own color according to the drawing event by the own character. Then, when the drawing event data of the enemy character is received, the game progress unit 121 repaints the overlapping portion of Area A81 painted with the own color with the enemy color, so that Area A82 is painted with the enemy color.

On the other hand, similarly, even in a case where the drawing event that the enemy character paints Area A82 partially overlapping with Area A81 with the corresponding color of the enemy character occurs immediately after the drawing event that the own character paints Area A81 with the own color occurs, Area A82 is painted with the corresponding color of the enemy character according to the drawing event that the area is painted with the corresponding color of the enemy character on the user side of the enemy character as illustrated in FIG. 9. Then, in a case where the drawing event data of the own character is received, Area A81 comes to be painted with the corresponding color of the own character so that a portion of Area A82 is repainted with the own color. Therefore, the area on the user side of the own character (FIG. 8) and the area on the user side of the enemy character (FIG. 9) are different from each other in the drawing state (that is, a color painted thereon) of the overlapping area. Actually, since the drawing event that the enemy character paints Area A82 with the corresponding color of the enemy character occurs immediately after the drawing event that the own character paints Area A81 with the own color occurs, the drawing state of FIG. 8 should be shown to all the users originally.

In order to avoid such inconsistency in the drawing state, the drawing event data includes information of an occurrence time of the drawing event in addition to the information indicating the content of the drawing event. The information indicating the content of the drawing event, for example, may be the information for defining the drawing event described above. The game progress unit 121 paints the area of the virtual space according to the drawing event data generated by itself and the drawing event data of the enemy character obtained from the outside. At this time, the information of the occurrence time of the drawing event is recorded in the 3200×3200 depth buffer 124 corresponding to a texture of the virtual space, and the information generated later is left. Therefore, even when an order of the occurrence of the drawing events and an order of drawing processes in the virtual space according to the drawing events by the game progress units 121 are mixed with each other due to the delay caused by the communication, the final drawing state is not different for the information processing system 100 of any user.

Figure 10A:
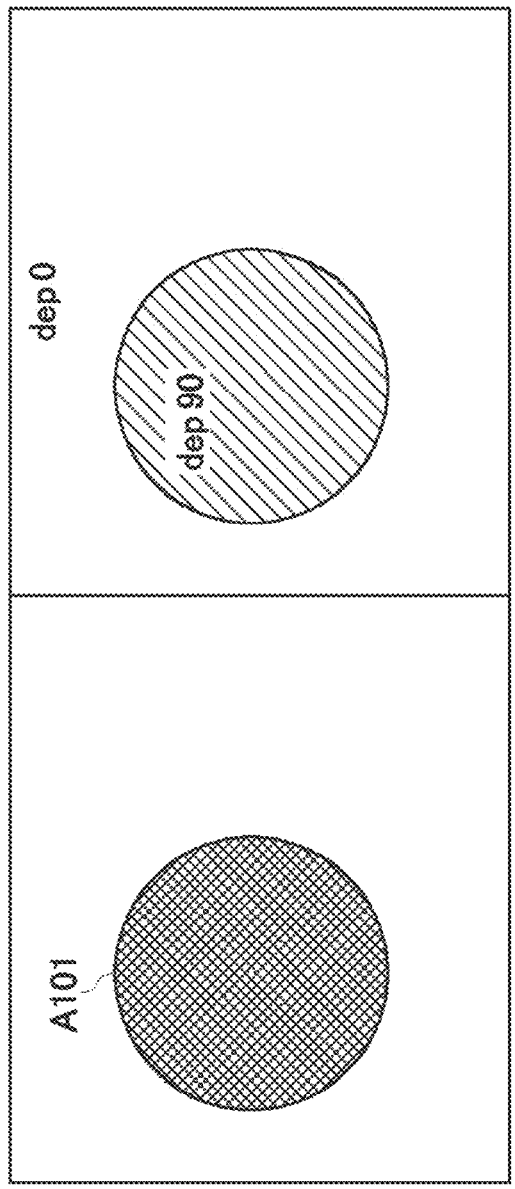
FIG. 10A shows an example non-limiting virtual space which is drawn with a corresponding color using time information.
Figure 10B:
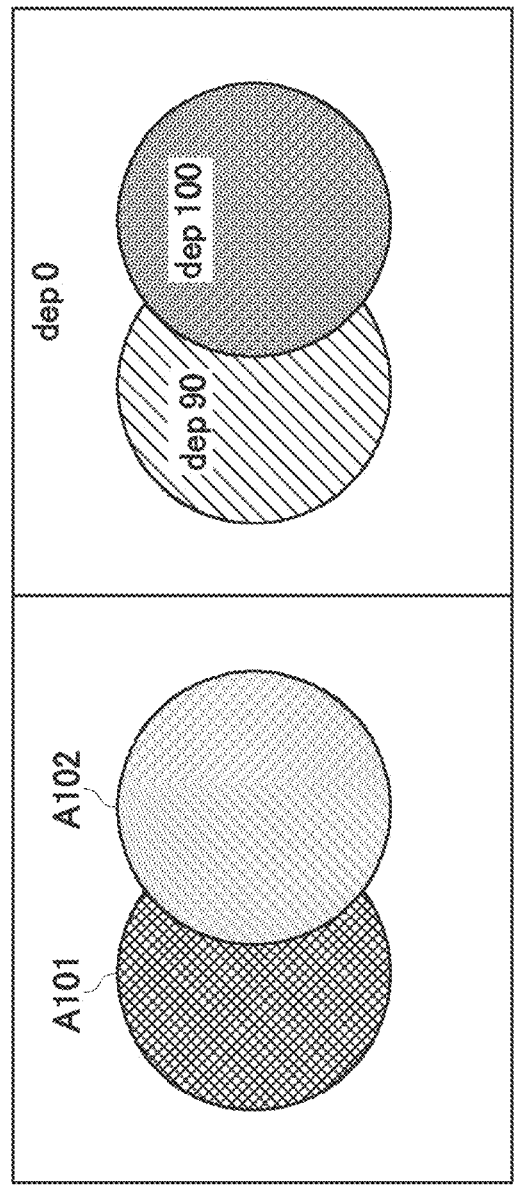
FIG. 10B shows an example non-limiting virtual space which is drawn with the corresponding color using the time information.

FIGS. 10A and 10B show examples non-limiting virtual space which is drawn with a corresponding color using time information. FIGS. 10A and 10B show cases where the drawing event that Area A101 is painted with orange occurs before the drawing event that Area A102 partially overlapping with Area A101 is painted with blue. In FIGS. 10A and 10B, the virtual space to be drawn is illustrated on the left, and a depth value to be stored in the depth buffer 124 is illustrated on the right. In this example, as illustrated in FIG. 10A, the game progress unit 121 first processes the drawing event that Area A101 is painted with orange, and then as illustrated in FIG. 10B processes the drawing event that Area A102 is painted with blue. Herein, the drawing event data of the drawing event painting Area A101 is "Position: (2, 5), Radius: 5 m, Color: Orange, Time: 90", and the drawing event data of the drawing event painting Area A102 is "Position: (8, 5), Radius: 5 m, Color: Blue, Time: 100".

As illustrated in FIG. 10A, the game progress unit 121 draws Area A101 with orange, and a depth value of 90 corresponding to Time 90 at a position corresponding to Area A101 is stored in the depth buffer 124. Next, as illustrated in FIG. 10B, the game progress unit 121 draws Area A102 with blue, and a depth value of 100 corresponding to Time 100 at a position corresponding to Area A102 is stored in the depth buffer 124. At this time, an overlapping area between Area A101 and Area A102 is drawn with blue such that the blue area having a depth value of 100 is put on the orange area having a depth value of 90, that is, one having a large depth value (later occurrence time of the drawing event) becomes the finally drawn area.

Figure 11A:
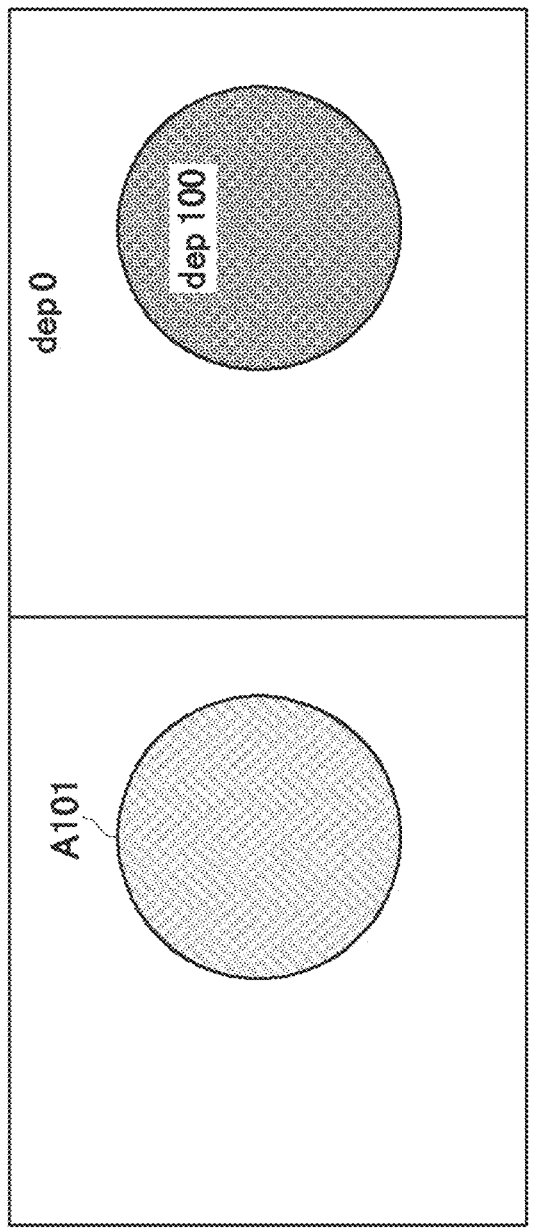
FIG. 11A shows an example non-limiting virtual space which is drawn with a corresponding color using time information.
Figure 11B:
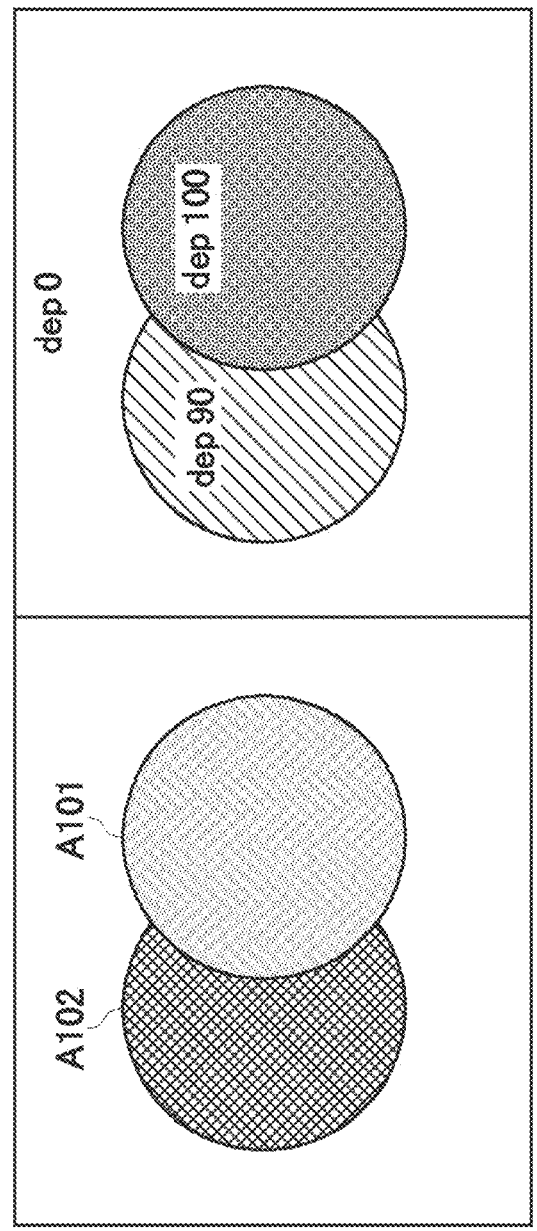
FIG. 11B shows an example non-limiting virtual space which is drawn with the corresponding color using the time information.

FIGS. 11A and 11B show examples other non-limiting virtual spaces which are drawn with the corresponding color using the time information. Similarly to the examples of FIGS. 10A and 10B, FIGS. 11A and 11B also illustrate a case where the drawing event painting Area A101 with orange occurs earlier than the drawing event painting Area A102 partially overlapping with Area A101 with blue. However, as illustrated in FIG. 11A, in these examples, the game progress unit 121 first processes the drawing event painting Area A102 with blue, and then as illustrated in FIG. 11B processes the drawing event painting Area A101 with orange. The contents of the respective pieces of drawing event data are the same as those of the examples of FIGS. 10A and 10B.

As illustrated in FIG. 11A, the game progress unit 121 draws Area A102 with blue, and a depth value of 90 corresponding to Time 90 at a position corresponding to Area A102 is stored in the depth buffer 124. Next, the game progress unit 121 draws Area A101 with orange, and a depth value of 100 corresponding to Time 100 at a position corresponding to Area A101 is stored in the depth buffer 124. At this time, in a case where time is not taken into consideration, since the painting is performed in the drawing order, the overlapping area between Area A101 and Area A102 is drawn with orange which is made in a later drawing process. However, the game progress unit 121 of the embodiment draws the overlapping area between Area A101 and Area A102 with blue such that the blue area having a depth value of 100 is put on the orange area having a depth value of 90, that is, one having a large depth value (later occurrence time of the drawing event) becomes the finally drawn area.

Further, in an actual game, a numerical value obtained by adding an offset value which is differently set for each character generated by the drawing event to an occurrence time value is used as the depth value. For example, in a case where the depth value is given in units of integers based on time, the respective characters are assigned with the offset values such as 0.1, 0.2, 0.3 and so on which are smaller than a minimum unit of the depth value based on time and are differently set for the respect characters. In other words, in a case where the drawing evens of a plurality of characters occur at the same time, the order of the drawing events of the characters are determined in advance. Therefore, even in a case where the plurality of drawing event data partially overlapping with at least the drawing area are generated at the same time, the depth values do not become equal, so that it is guaranteed that the final result is uniquely determined.

The battle determination unit 122 performs the battle determination by comparing the drawing state of the own color and the drawing state of the enemy color at the time of the game over. Specifically, the battle determination unit 122 compares a range of the ground painted with the own color and a range of the ground painted with the enemy color. As a comparison result, in a case where the range of the ground painted with the own color is wide, it is determined that the own team wins, and in a case where the range of the ground painted with the enemy color is wide, it is determined that the enemy team wins. In other words, the battle determination unit 122 determines victory or defeat based on wideness of the painted color range. In a case where a plurality of teams participate, a team which paints a widest range with the corresponding color is determined as a winner. Further, the game will be over at the time when a predetermined time elapses from the beginning.

Specifically, as described above, since the drawing operation by the game progress unit 121 is performed according to a symbol representing a team which is stored for every pixel in the stencil buffer 123 as the drawing data, the battle determination unit 122 acquires areas of the corresponding colors of the respective teams by counting the number of pixels at the time of the game over and compares these areas.

As described above, according to the information processing system of the embodiment, there is provided a new game in which the virtual space is drawn with the corresponding color of the own character by controlling the own character in the virtual space, and the battle determination is performed based on the drawing state and the drawing state of the corresponding color of the enemy character.

Further, in the above-mentioned embodiment, the face to be painted with the ink by the character is described only as the "ground" of the virtual space, but embodiments of the technology are not limited thereto. The face to be painted with the ink by the character may be walls, ceilings, and the like on the path where the character moves in the virtual space, or may be surfaces of arbitrary objects.

Further, in the above-mentioned embodiments, in order to share the drawing states in a case where the plurality of users play the game through communication, a relatively small size of drawing event data is transmitted and received instead of a relatively large size of drawing data. Further, in order not to generate inconsistency in the drawing state among the plurality of users, information of the occurrence time of the drawing event is included in the drawing event data, but instead of the drawing event data, the drawing data may be transmitted and received together with the information of the occurrence time of the drawing event. Even in this case, the size of data to be transmitted and received becomes large, but it is possible to avoid the above-mentioned inconsistency in the drawing state among the plurality of users.

What is claimed is:

1. A computer program product that is stored on a non-transitory computer readable storage medium, the computer program product comprising instructions that, when executed, are configured to cause a computer system to perform operations comprising:

generating a virtual game space that includes a plurality of virtual characters, including at least a first virtual character and a second virtual character;

processing an operation input that is provided by a user;

controlling, based on the operation input, the first virtual character that is located in the virtual game space to paint at least a first portion of the virtual game space in a first color that is associated with the first virtual character;

updating the virtual game space to paint at least a second portion of the virtual game space in a second color, which is different from the first color, that is associated with the second virtual character;

determining a painted color, between at least the first and second colors, for an area in which the first virtual character is located within the virtual game space; and controlling the first character based on which of the at least the first and second colors is determined to be the painted color.

2. The computer program product of claim 1, wherein the operations further comprise:

moving the first virtual character in the virtual game space based on operation input, wherein the first portion of the virtual game space that is painted in the first color is based on a position of the first virtual character within the virtual game space.

3. The computer program product of claim 1, wherein the second portion of the virtual game space is painted in the second color based on the second virtual character performing an action within the virtual game space.

4. The computer program product of claim 1, wherein the operations further comprise:

generating first character painting event data, which indicates a painting event for the first virtual character, based on the operation input; and communicating the first character painting event data to another computer system.

5. The computer program product of claim 4, wherein the operations further comprise:

receiving second character painting event data from a or the another computer system, wherein the second portion of the virtual game space is painted based on reception of the second character painting event data.

6. The computer program product of claim 5, wherein the second character painting event data includes time data, wherein the operations further comprise:

determining whether an overlap area within the virtual game space would overlap the first color and the second color; and painting the overlap area in one of the first and second color based on the time data included in the second character painting event data.

7. The computer program product of claim 4, wherein the first character painting event data includes position data and color data.

8. The computer program product of claim 1, wherein the operations further comprise performing a battle determination based on a painting state of the second color that is associated with the second virtual character and a painting state of the first color that is associated with the first character.

9. The computer program product of claim 1, wherein the operations further comprise:

based on a successful attack action performed by the first virtual character on the second virtual character, painting a peripheral area in the virtual game space in the first color.

10. The computer program product of claim 1, wherein the operations further comprise:

displaying painting results based on how the first and second colors have been painted within the virtual space based on provided user input operations.

11. A computer system comprising:

a user input device configured to process input provided by a user; and a first processing system that includes at least one hardware processor, the first processing system configured to:

generate a virtual game space that includes a plurality of virtual characters, including at least a first virtual character and a second virtual character;

process an operation input that is provided by the user via the user input device;

control, based on the operation input, the first virtual character that is located in the virtual game space to paint at least a first portion of the virtual space in a first color that is associated with the first virtual character;

update the virtual game space to paint at least a second portion of the virtual game space in a second color, which is different from the first color, that is associated with the second virtual character; and control the first character based on a determination of which color, of the at least the first and second colors, an area in which the first virtual character is located within the virtual game space.

12. The computer system of claim 11, wherein the first processing system is further configured to:

move the first virtual character in the virtual game space based on operation input, wherein movement of the first virtual character in the virtual game space is further based a color, of the at least the first and second colors, of an area in which the first virtual character is currently located.

13. The computer system of claim 11, wherein the second portion of the virtual game space is painted in the second color based on the second virtual character performing an action within the virtual game space.

14. The computer system of claim 11, wherein the first processing system is further configured to:

generate first character painting event data, which indicates a painting event for the first virtual character, based on the operation input; and communicate, via a transceiver of the first processing system, the first character painting event data, first character painting event data being provided to a second processing system.

15. The computer system of claim 14, further comprising:

the second processing system that includes at least one hardware processor, the second processing system configured to:

receive the first character painting event data;

paint at least a portion of the virtual game space in the first color that is associated with the first virtual character based on reception of the first character painting event data; and communicate second character painting event data, which indicates a painting event for the second virtual character.

16. The computer system of claim 14, wherein the second character painting event data includes time data, wherein an area within the virtual game space that is determined to have the first color and second color overlap is painted based on the time data.

17. A method performed on a computer system, the method comprising:
- generating a virtual game space that includes a plurality of virtual characters, including at least a first virtual character and a second virtual character;
- processing a painting operation input that is provided by a user;
- controlling, based on the operation input, the first virtual character that is located in the virtual game space to paint at least a first portion of the virtual game space in the first color that is associated with the first virtual character;
- updating the virtual game space to paint at least a second portion of the virtual game space in a second color, which is different from the first color, that is associated with the second virtual character;
- determining a painted color, between at least the first and second colors, for an area in which the first virtual character is located within the virtual game space; and
- controlling the first character based on which of the at least the first and second colors is determined to be the painted color.

18. The method of claim 17, wherein controlling the first character includes controlling how the first character moves through the virtual game space based on which of the at least the first and second colors is determined to be the painted color.

19. The method of claim 17, further comprising:
- determining whether an overlap area within the virtual game space would cause an overlap between the first color and the second color; and
- painting the overlap area in one of the first and second color based on time data associated with respective painting event data that is associated with each of the painting of the first portion and the painting of the second portion.

20. The method of claim 17, further comprising:
- generating first character painting event data, which indicates a painting event for the first virtual character, based on the operation input; and
- communicating the first character painting event data to another computer system.

* * * * *